US005899276A

United States Patent [19]

Relyea et al.

[11] Patent Number: 5,899,276

[45] Date of Patent: May 4, 1999

[54] BUMPER-MOUNTED EXTENSIBLE TURRET

[75] Inventors: Robert G. Relyea, Dallas; Grady C. North, Grapevine, both of Tex.

[73] Assignee: Crash Rescue Equipment Service, Inc., Dallas, Tex.

[21] Appl. No.: 08/926,858

[22] Filed: Sep. 10, 1997

[51] Int. Cl.[6] .......................... A62C 27/00; A01G 25/09

[52] U.S. Cl. .............................. 169/25; 169/24; 169/51; 169/52; 239/159; 239/164; 239/165; 239/166; 239/172

[58] Field of Search ................................ 169/24, 25, 51, 169/52; 239/159, 160, 164, 165, 166, 172, 176

[56] References Cited

U.S. PATENT DOCUMENTS

| | | | |
|---|---|---|---|
| 350,569 | 10/1886 | Strobel . | |
| 1,538,881 | 5/1925 | Barton . | |
| 2,352,379 | 6/1944 | Geertz | 169/24 |
| 2,698,664 | 1/1955 | Freeman | 169/25 |
| 2,995,307 | 8/1961 | McMahon | 239/161 |
| 3,225,777 | 12/1965 | Shelton et al. | 134/141 |
| 3,346,052 | 10/1967 | Moore et al. | 169/25 |
| 3,599,722 | 8/1971 | Davidson et al. | 169/24 |
| 3,840,074 | 10/1974 | Clark | 169/24 |
| 3,913,836 | 10/1975 | Stevenson | 239/166 |
| 3,989,109 | 11/1976 | Gagliardo | 169/24 |
| 4,392,618 | 7/1983 | Evans et al. | 239/461 |
| 4,674,686 | 6/1987 | Trapp | 239/279 |
| 4,875,526 | 10/1989 | Latino et al. | 169/24 |
| 5,211,245 | 5/1993 | Relyea et al. | 169/24 |
| 5,249,632 | 10/1993 | Sparling et al. | 169/52 |
| 5,488,995 | 2/1996 | Kuwahara | 169/24 |
| 5,538,185 | 7/1996 | Rabitsch et al. | 239/76 |

FOREIGN PATENT DOCUMENTS

| | | | |
|---|---|---|---|
| 2137312 | 2/1973 | Germany | 169/24 |
| 795539 | 1/1981 | U.S.S.R. | 169/24 |
| 8102825 | 10/1981 | WIPO | 239/166 |

*Primary Examiner*—Andres Kashnikow
*Assistant Examiner*—Robin O. Evans
*Attorney, Agent, or Firm*—Jones, Day, Reavis & Pogue

[57] ABSTRACT

A forward-mounted fluid-dispensing boom on a fire-fighting vehicle that can move between a retracted position and a fully extended position directly in front of the vehicle.

5 Claims, 2 Drawing Sheets

BUMPER-MOUNTED EXTENSIBLE TURRET

BACKGROUND OF THE INVENTION

1. Field of the Invention

The present invention relates in general to fire-fighting vehicles having fluid discharge assemblies thereon and in particular to a fire-fighting vehicle that has a bumper-mounted fluid nozzle assembly pivotally mounted on the outer end of an extensible fluid-carrying boom and that can be mounted on the forward end of the vehicle in substantially the center of the forward end for selectively receiving fluid and being movable between a first retracted position and a second fully extended position in front of the vehicle.

2. Description of Related Art Including Information Disclosed Under 37 CFR 1.97 and 1.98

There are many different types of fire-fighting equipment such as that shown in U.S. Pat. No. 5,211,245, incorporated herein by reference in its entirety, in which an aerial lift is used with a vehicle for positioning a fluid nozzle on the outer end of an upper boom that is coupled at its inner end to the outer end of a lower boom. The lower boom can be selectively raised and lowered in a plane from and above the horizontal and rotated about a vertical axis. The advantage of the aerial lift disclosed therein is that the assembly has an upper boom that can be tilted or pivoted toward the ground as well as being pivotable upwardly. Further, it has a nozzle assembly on the outer end of the upper boom which can be pivoted both in the vertical plane and rotated in a plane perpendicular to the vertical plane. Thus, with the invention disclosed in U.S. Pat. No. 5,211,245, an operator of the vehicle having the aerial lift thereon can drive towards the fire and position the booms and nozzle in any position advantageous to ejecting fire-fighting chemicals on the blaze. In the vehicle there is a control console that has a first joystick for positioning the booms in a vertical plane and a second joystick for positioning the nozzle in both the vertical and the horizontal planes.

There are many instances in the fighting of fires where it would not be required to have such a complicated and large and expensive boom system when a shorter boom system mounted directly in front of the vehicle and in view of the operator could be retracted or extended very quickly. Such a boom could have the nozzle assembly disclosed in U.S. Pat. No. 5,211,245, which is pivotable both in the vertical plane and in a plane perpendicular to the vertical plane.

SUMMARY OF THE INVENTION

The present invention relates to a forward-mounted fluid-dispensing boom on a fire-fighting vehicle. The vehicle has a rigid frame forming at least a portion of the forward end of the vehicle. A hollow, fluid-carrying extendible boom is mounted on the rigid frame in substantially the center of the forward end of the vehicle for selectively receiving fluid and being movable between a first retracted position and a second fully extended position in front of the vehicle. It has a fluid-dispensing nozzle pivotally attached to the outer end of the fluid-carrying boom in fluid-receiving relationship for controllable movement in at least one plane.

The boom can be extendible in an axial direction along the length of the boom from the fully retracted to a fully extended position. A hollow collar may be pivotally mounted on the rigid frame portion for pivotal movement in at least one plane. However, the collar is pivotable in the at least one plane when, and only when, the fluid-carrying boom is substantially fully extended. Power means such as a hydraulic cylinder is coupled between the frame portion and the pivotable collar for selectively and pivotally moving the collar in the at least one plane to cause movement of the fluid-carrying boom in the at least one plane. Another power means can be used to extend the boom. A position sensor is mounted on the vehicle and coupled to the first power means so as to detect when the fluid-carrying boom is substantially fully extended for generating a signal that will allow the collar to be pivoted by the first power means thereby pivoting the fluid-carrying boom with it.

In another embodiment, the fluid-carrying boom comprises first and second sections that are rotatably mounted to each other and to the center of the rigid frame in front of the vehicle. When the boom is in its fully retracted position, both sections have their longitudinal axis perpendicular to the longitudinal axis of the vehicle and are rotatably positioned one section above the other. Thus the outer section is pivotally attached to one end of the first section for movement from a first position, parallel and adjacent the first section, to a second position in axial alignment with the first section and extending in front of the vehicle.

Thus it is an object of the present invention to provide a forward-mounted fluid-dispensing boom on a fire-fighting vehicle.

It is another object of the present invention to provide a fire-fighting vehicle that has a forward-mounted fluid-dispensing boom that can be extended from a fully retracted position to a fully extended position in front of the vehicle.

It is a further object of the present invention to provide an axially extending boom in front of the vehicle that can be pivoted in at least one plane only when it is in its maximum extended position.

Thus in the generic embodiment, the invention relates to a forward-mounted fluid-dispensing boom on a fire-fighting vehicle comprising a rigid frame forming at least a portion of the forward end of the vehicle, a hollow, fluid-carrying, extendible boom mounted on the rigid frame in substantially the center of the forward end of the vehicle for selectively receiving fluid and being movable between a first retracted position and a second fully extended position in front of the vehicle, and a fluid-dispensing nozzle pivotally attached to the outer end of the fluid-carrying boom in fluid-receiving relationship for controllable movement in at least one plane.

The invention also relates to a forward-mounted fluid-dispensing boom that is extendible in an axial direction along the length of the boom from the fully retracted to the fully extended position.

The invention also relates to a foldable fluid-carrying boom assembly that has a first and second section pivotally attached to each other and pivotally mounted to the center of the rigid frame in front of the vehicle and in which a first power means coupled between the vehicle and the first section pivotally moves the first fluid-carrying section between a retracted position adjacent the front end of the vehicle perpendicular to the longitudinal axis of the vehicle and a forwardly-extending position in front of the vehicle with its longitudinal axis in axial alignment with the vehicle longitudinal axis. The second hollow fluid-carrying section is pivotally attached to the outer end of the first hollow fluid-carrying section for movement from a first position parallel and adjacent the first section to a second position in axial alignment with the first section and extending in front of the vehicle.

BRIEF DESCRIPTION OF THE DRAWINGS

These and other features of the present invention will be more fully disclosed when taken in conjunction with the following DETAILED Description of the Preferred Embodiments(s) in which like numerals represent like elements and in which.

DETAILED DESCRIPTION OF THE PREFERRED EMBODIMENT(S)

Figure 1:
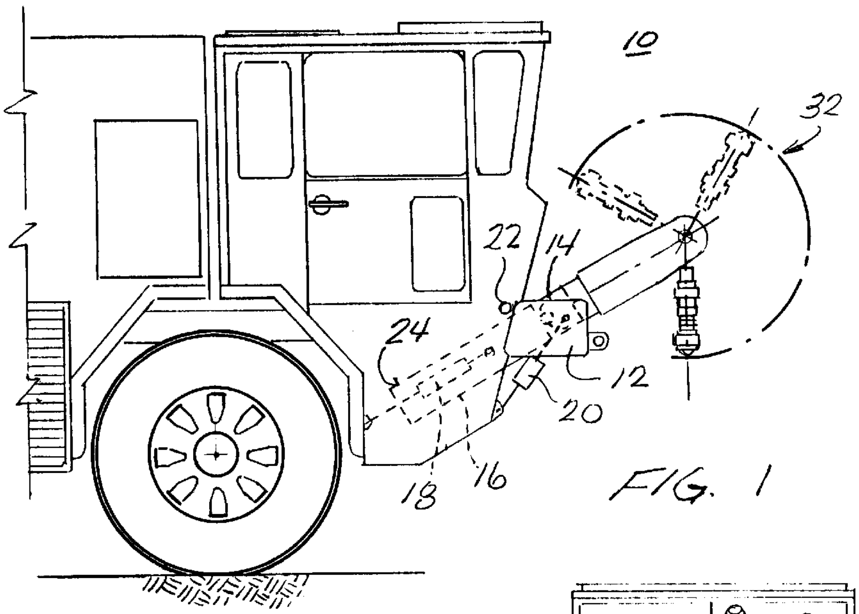
FIG. 1 is a partial side view of a fire-fighting vehicle illustrating an extensible boom on the front of the vehicle in its retracted position and which can be extended axially in front of the vehicle.
Figure 2:
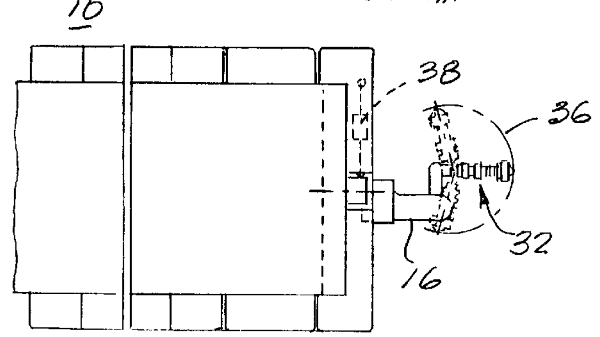
FIG. 2 is a top view of the fire-fighting vehicle front end illustrating the fluid-carrying boom assembly in its retracted position.
Figure 4:
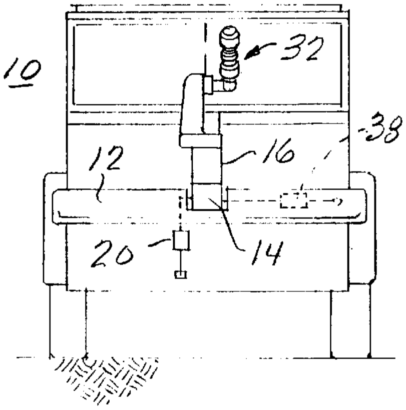
FIG. 4 is a front view of the fire-fighting vehicle illustrating the fluid-carrying boom assembly in its fully extended position.
Figure 3:
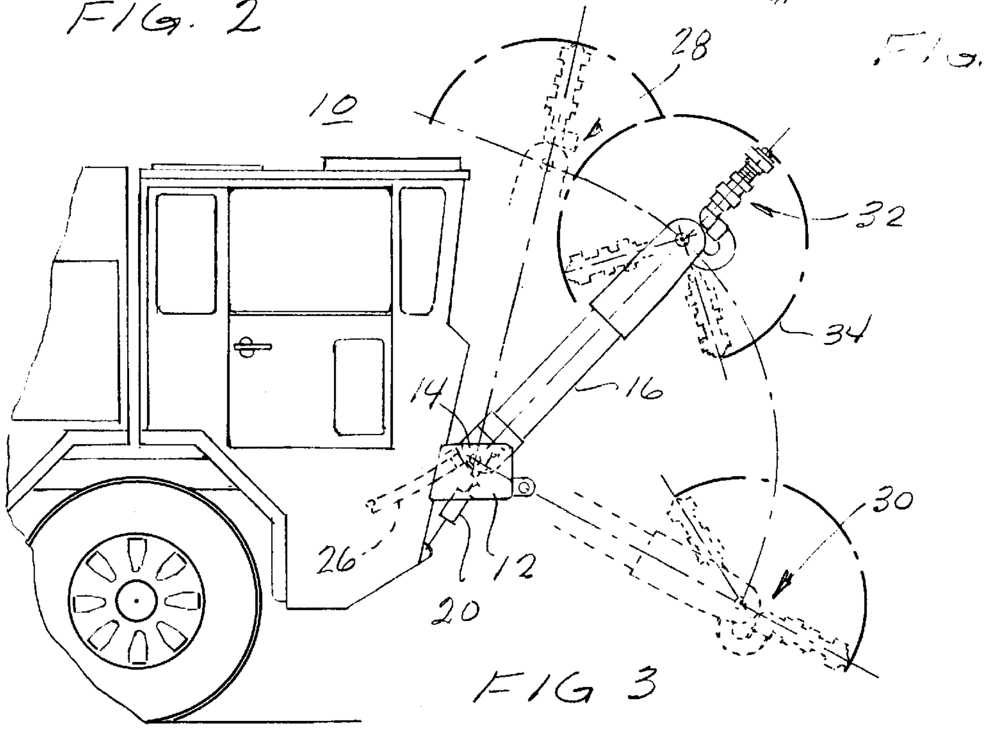
FIG. 3 is a partial side view of a fire-fighting vehicle with the forwardly-mounted fluid-carrying boom assembly in its fully extended position and illustrating its ability to move in a vertical plane.
Figure 5:
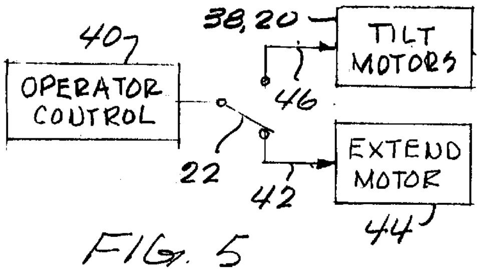
FIG. 5 is a circuit diagram illustrating a limit switch utilized with the vehicle of FIGS. 1, 2, 3, and 4 such that the boom can be extended to its outer limit at which time the limit switch then allows the operator to tilt the vertically-extended boom.

FIG. 1 is a diagrammatic representation of a partial side view of a fire-fighting vehicle 10 having thereon a forward-mounted fluid-dispensing boom 16 that is mounted on a rigid frame 12 forming at least a portion of the forward end of the vehicle. The hollow, fluid-carrying, extendible boom 16 is mounted on the rigid frame in substantially the center of the forward end of the vehicle as can be best shown in FIG. 2. It selectively receives fire-fighting fluid through a coupling 26 shown in FIG. 3 and is movable between a first retracted position shown in FIG. 1 and a second fully extended position in front of the vehicle as shown in FIG. 3. A fluid-dispensing nozzle 32 is pivotally attached to the outer end of the fluid-carrying boom 16 in fluid receiving relationship for controllable movement in at least one plane that is shown to be the vertical plane in FIG. 3 and a horizontal plane in FIG. 2. In the embodiment shown in FIGS. 1–4, a hollow collar 14 slidably receives boom 16 and is pivotally mounted on the rigid frame portion 12 of the vehicle for pivotal movement in at least one plane. The collar 14 is pivotable when, and only when, the fluid-carrying boom 16 is substantially fully extended. In order to accomplish this, a circuit such as shown in FIG. 5, in general form, is used. The operator control 40 sends a signal through a position switch such as limit switch 22 (shown in FIG. 1) on line 42 to the extend motor 44. When the boom is fully extended, limit switch 22 (in FIG. 1) is activated by a stop 24 of any particular construction to cause the limit switch to move from the position shown in FIG. 5 to a connection with conductor 46 that is coupled to tilt motors 20 and 38 shown in FIGS. 1–3. The operator can then control the tilt motors to move the boom upwardly or downwardly as shown in FIG. 3. Of course, with a universal connection between the hollow collar 14 and frame 12, the device could also move in the horizontal plane. Thus, the boom 16 cannot be moved in the vertical plane as shown in FIG. 3 unless the limit switch 22 has been activated by substantially full extension of the boom 16.

As can be seen in FIG. 1, the boom 16 can be extended by any well-known power means such as a hydraulic actuator 18. It can also be tilted, when substantially fully extended, by any well-known power means such as hydraulic actuator 20. These actuators are shown in FIG. 1 and FIG. 3. If desired, and by using a universal mounting of the hollow collar 14, it can also be moved in the horizontal position by a power means such as hydraulic actuator 38 shown in FIG. 2 and FIG. 4.

Figure 6:
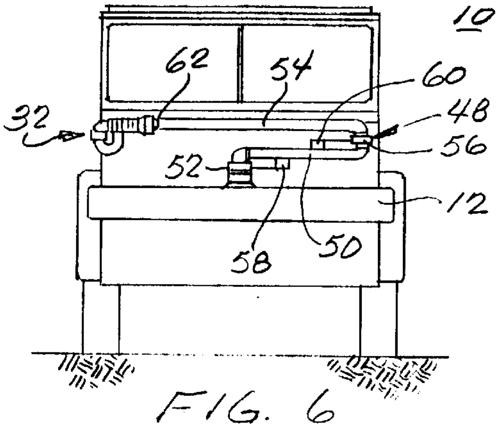
FIG. 6 is a front view of a second embodiment of a foldable nozzle assembly that is forwardly mounted on the vehicle and shown in its retracted position but which can be extended in a direction in front of the vehicle in axial alignment with the longitudinal axis of the vehicle.
Figure 7:
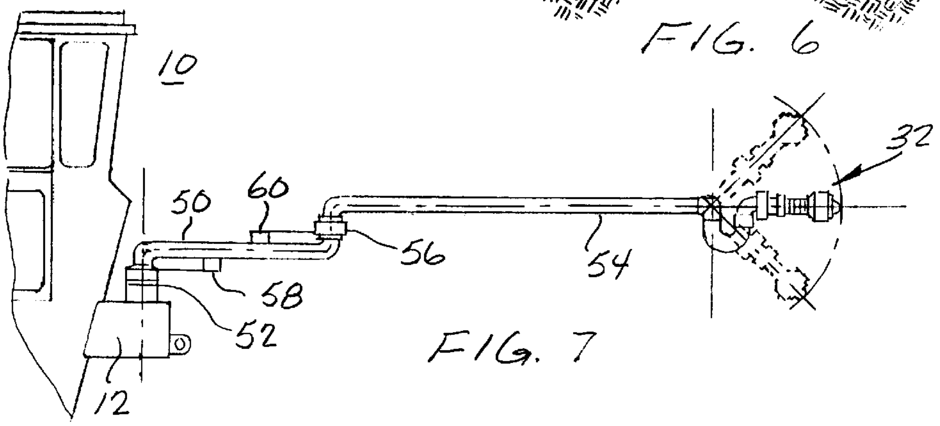
FIG. 7 is a partial side view of the fire-fighting vehicle illustrating the foldable nozzle in its fully extended position.
Figure 8:
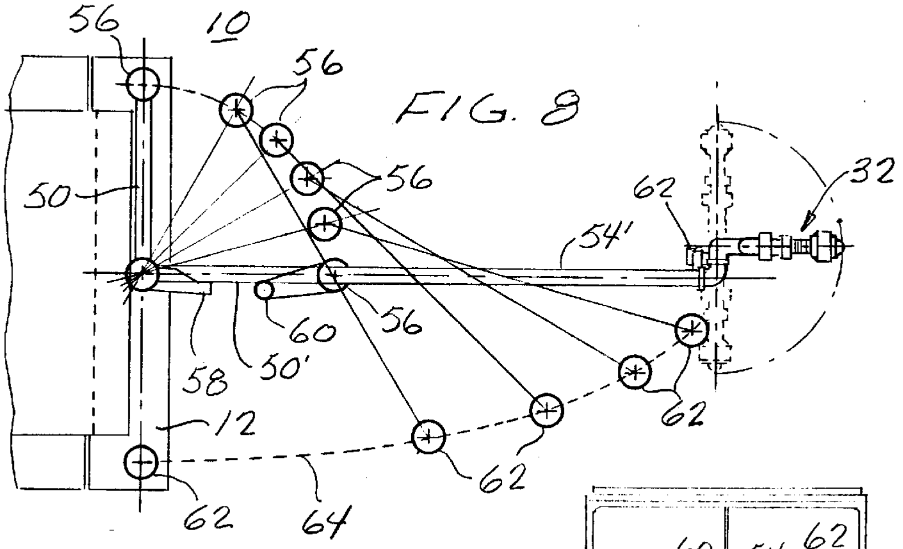
FIG. 8 is a top view of the front end of the fire-fighting vehicle illustrating the manner in which the retracted boom is incrementally unfolded to its maximum extended position.

FIGS. 6, 7, and 8 illustrate a second embodiment of the extensible boom mounted on the forward end of a fire-fighting vehicle 10. In the front, retracted view, as shown in FIG. 6, the extendible boom is rotated or parked to the left side of the vehicle (facing the vehicle) and formed from a first section 50 pivotally attached to the vehicle frame member 12 at 52 and a second boom section 54 pivotally coupled to the first section 50 at 56. Thus, the entire extendible boom system 48 is in the retracted position as shown in FIG. 6 with both boom sections 50 and 54 being vertically spaced and adjacent the front end of the vehicle with the longitudinal axis of each boom section being perpendicular to the longitudinal axis of the vehicle. On the outer end 62 of the upper boom section 54, the nozzle assembly 32 is mounted and it operates as discussed in commonly assigned U.S. Pat. No. 5,211,245, which has been incorporated herein by reference in its entirety. When it is desired to extend the boom out in front of the vehicle as shown in FIG. 7, operator controlled motors 58 and 60 are used to pivot the boom sections accordingly. Thus motor 58, through any well-known mechanism such as worm gears or chain drives, rotates lower boom section 50 pivotally about connection 52 towards the outer end of the vehicle as shown in FIG. 8 wherein pivot point 56 is shown moving in an arc from its position perpendicular to the longitudinal axis of the vehicle to the position extending in a forward direction in axial alignment with the longitudinal axis of the vehicle. The various circles 56 in FIG. 8 illustrate the respective positions of the pivot point 56 as the boom is moving outwardly. At the same time, the upper boom 54 is also moving outwardly in the opposite direction following an arc 64 shown in FIG. 8. The positions shown by the circles 62 are coupled to the corresponding positions of the pivot point for the lower boom 50 illustrating how the two booms move together to extend outwardly to its fully extended position. Thus boom 50 moves from its retracted position to the fully forward position shown by the numeral 50' and the upper boom 54 moves from the retracted position to the outwardly extended position designated by the numeral 54'. As illustrated in FIG. 8, the motors 58 and 60 could be attached to the lower boom section 50 and have chain drives to the pivot points 52 and 56 to cause respective pivoting motion of the boom sections 50 and 54 as shown in FIG. 8. Again, of course, any well-known type of system for rotating the booms could be used.

Figure 9:
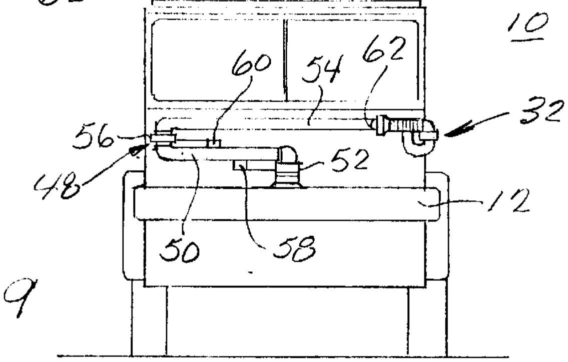
FIG. 9 is a front view of the fire-fighting vehicle illustrating the retracted nozzle assembly folded in the opposite direction from that shown in FIG. 6.

FIG. 9 is identical to FIG. 6 except that the boom is pivoted or folded in a retracted position to the right side of the vehicle (while facing it), while in FIG. 6, it is pivoted or folded to the left of the vehicle (while facing it). Otherwise it functions identically as described in relation to FIG. 6.

Thus there has been disclosed a novel forward-mounted fluid-dispensing boom on a fire-fighting vehicle. It is pivotally mounted on a rigid frame forming at least a portion of the forward end of the vehicle in substantially the center of the forward end of the vehicle and selectively receives fire-fighting fluid. It is movable between a first retracted position and a second fully extended position on front of the vehicle. It has a fluid dispensing nozzle pivotally attached to the outer end of the fluid-carrying boom in fluid-receiving relationship for controllable movement in at least one plane and preferably both planes as described in U.S. Pat. No. 5,211,245, incorporated herein by reference.

In one embodiment, the boom is extended in an axial direction along the length of the boom from the fully retracted to the fully extended position. In another embodiment, the boom is formed in two sections and folds to a retracted position adjacent the front end of the vehicle with the longitudinal axis of the boom sections being perpendicular to the longitudinal axis of the vehicle. Each of the booms can be rotatably moved to an in-line extended position that is axially aligned with the vehicle axis and longitudinally extending in front of the vehicle.

The corresponding structures, materials, acts, and equivalents of all means or step plus function elements in the claims below are intended to include any structure, material, or act for performing the function in combination with other claimed elements as specifically claimed.

We claim:

1. A forward-mounted fluid-dispensing boom on a fire-fighting vehicle comprising:

a rigid frame forming at least a portion of the front end of the vehicle;

a hollow fluid-carrying extendible boom mounted on said rigid frame in substantially the center thereof for selectively receiving fire-fighting fluid and being extendable in an axial direction along the length of the boom between a first retracted position adjacent the vehicle front end and a second fully extended position in front of the vehicle, said axial direction having both a horizontal and a vertical component; and a fluid dispensing nozzle pivotally attached to the outer end of the fluid-carrying boom in fluid-receiving relationship for controllable movement in at least one plane.

2. The forward-mounted fluid-dispensing boom of claim 1 further comprising:

a hollow collar pivotally mounted on the rigid frame portion of the vehicle for slidably receiving said boom and for movement in at least one plane; and said collar being pivotable in said at least one plane when, and only when, said fluid-dispensing boom is substantially fully extended.

3. The forward-mounted fluid-dispensing boom of claim 2 further comprising:

first power means coupled between the frame portion and the pivotable collar for selectively and pivotably moving said collar in said at least one plane to cause movement of said fluid-carrying boom in said at least one plane; and a position sensor mounted on said vehicle and coupled to said power means so as to detect when said fluid-carrying boom is substantially fully extended and then generating a signal that will allow the collar to be pivoted by the first power means thereby pivoting the fluid-carrying boom.

4. A forward-mounted fluid-dispensing boom on a fire-fighting vehicle comprising:

a rigid frame forming at least a portion of the front end of the vehicle;

a hollow fluid-carrying extendible boom mounted on said rigid frame in substantially the center thereof for selectively receiving fire-fighting fluid and being movable between a first retracted position adjacent the vehicle front end and a second fully extended position in front of the vehicle, said hollow fluid-carrying extendable boom comprising at least a first section rotatably mounted at one end to the center of the rigid frame in front of the vehicle for rotation in substantially a horizontal plane and for selectively receiving fluid;

first power means coupled between the vehicle and the first hollow fluid-carrying section for pivotally moving the first hollow fluid-carrying section between a retracted position adjacent the front end of the vehicle with its longitudinal axis perpendicular to the longitudinal axis of the vehicle and a forwardly extending position in front of the vehicle with its longitudinal axis in axial alignment with the vehicle longitudinal axis; and a fluid dispensing nozzle pivotally attached to the outer end of the fluid-carrying boom in fluid-receiving relationship for controllable movement in at least one plane.

5. The forward-mounted fluid-dispensing boom assembly of claim 4 further comprising:

a second hollow fluid-carrying section pivotally attached to the other end of the first hollow fluid-carrying section for movement from a first position parallel and adjacent the first section to a second position in axial alignment with the longitudinal axis of said first section and extending in front of the vehicle.

* * * * *